(12) United States Patent
Hendriks et al.

(10) Patent No.: US 6,687,037 B2
(45) Date of Patent: Feb. 3, 2004

(54) OPTICAL SCANNING DEVICE

(75) Inventors: Bernardus Hendrikus Wilhelmus Hendriks, Eindhoven (NL); Jeroen Wals, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/942,018

(22) Filed: Aug. 29, 2001

(65) Prior Publication Data

US 2002/0118427 A1 Aug. 29, 2002

(30) Foreign Application Priority Data

Sep. 4, 2000 (EP) .............................. 00203066

(51) Int. Cl.$^7$ ............................................. G02B 26/08
(52) U.S. Cl. ....................... 359/205; 359/204; 359/569; 369/112.13
(58) Field of Search ............................ 359/205, 17, 19, 359/558, 562–563, 535, 566, 569–570, 572–575, 900; 369/112.01, 112.03, 112.05–112.15

(56) References Cited

U.S. PATENT DOCUMENTS

| 6,084,843 A | 7/2000 | Abe et al. ................... 369/112 |
| 6,462,874 B1 * | 10/2002 | Soskind ...................... 359/565 |

FOREIGN PATENT DOCUMENTS

JP          11194027         7/1999    ............ G01C/3/06

OTHER PUBLICATIONS

Katayama et al., "Dual–wavelength Optical Head With A Wavelength–selective filter For 0.6– And 1.2mm–thick substrate Optical Disks," Oct. 6, 1999, pp. 3778–3786.

Yamada et al., "DVD/CD/CD–R Compatible Pick–up With Two–wavelength Two–beam Laser," Mar. 8, 1998, pp. 591–600.

* cited by examiner

*Primary Examiner*—James Phan
(74) *Attorney, Agent, or Firm*—Michael E. Belk

(57) ABSTRACT

An optical device scans record carriers with radiation of two wavelengths. The device has an objective lens with a diffractive part with a pattern of elements of stepped profile. The total of the step heights are substantially equal to multiples of height $h_1$ with $$h_1 = \frac{\lambda_1}{(n-n_0)},$$

where $\lambda_1$ is the first wavelength, n is the refractive index of the diffractive part, and $n_0$ is the refractive index of an adjacent medium. The radiation of the first wavelength is transmitted through the diffractive part substantially without diffraction and the objective lens has a first focusing characteristic for the first wavelength. The radiation of the second wavelength is diffracted by the diffractive part and the objective lens has a second different focusing characteristic, for a selected diffractive order of the radiation of the second wavelength. The relative step height between adjacent steps is substantially equal to $ah_1$, wherein a is a positive integer.

16 Claims, 3 Drawing Sheets

OPTICAL SCANNING DEVICE

The present invention relates to an optical scanning device comprising an optical objective lens. More specifically, but not exclusively, the invention relates to an optical scanning device capable of writing and reading data from two different types of optical record carriers, such as compact disc (CD) and digital versatile disc (DVD), with laser radiation of a different wavelength, respectively, using a single optical objective lens system.

It is desirable for an optical scanning device to be capable of recording and reproducing optical record carriers of different formats. CDs are available, inter alia, as CD-As (CD-audio), CD-ROMs (CD-read only memory) and CD-Rs (CD-recordable). CDs are designed to be scanned with a wavelength of about 780 nm and a numerical aperture (NA) of 0.45, DVDs are designed to be scanned at a wavelength in the region of 660 nm. For reading DVDs an NA of 0.6 is generally used, whereas for writing DVDs an NA of 0.65 is generally required.

DVDs and CDs differ in the thickness of their transparent substrates, providing different information layer depths. The information layer depth for DVD is about 0.6 mm, whereas the depth for CD is about 1.2 mm. Thus if CDs are read with an optical scanning device with an objective lens optimised for DVD, a large amount of spherical aberration results at the information layer. It is possible to compensate for this effect when using a single objective lens system and a laser beam of 660 nm wavelength for reading both CD-ROMs and DVDs by reducing the numerical aperture (NA) for reading CD-ROMs from about 0.45 to 0.38, causing the spherical aberration to be within the limits for a proper reconstruction of the information stored on the CD-ROM. However, if in addition CD-Rs are to be scanned by the optical scanning device, a 780 nm laser beam has to be applied, because the CD-R is designed for writing and reading specifically at that wavelength. For CD-R organic dye is used as a recording film, of which the reflection characteristics change significantly with wavelength. It is difficult to achieve sufficient modulation for reflected radiation of 660 nm to reconstruct the information stored on a CD-R. Using a 780 nm laser beam and an NA of 0.45 for reading CDs with the same objective lens as used for DVD causes a large spherical aberration. Therefore the spherical aberration has to be compensated in some way in order to achieve an optical storage device capable of reading and/or recording CD-R, CD-ROM and DVD using laser radiation of 660 nm and 780 nm with a single optical objective lens.

Systems capable of reading DVD and CD by using laser radiation of different wavelengths with the same objective lens are known in the art. WO 99/57720 describes such a system, which uses a moulded plastic lens having either two refractive aspheric surfaces or one aspherical surface and one refractive spherical surface including a diffractive element. The lens is capable of correcting for spherical aberration caused by the difference in thickness for the two disc formats as well as for chromatic aberration.

EP-A-936604 describes an optical pickup device suitable for reading and writing discs of DVD, CD-R and CD-ROM format with laser radiation of two different wavelengths. For this purpose an optical element with a first diffraction grating pattern in its central region and a second diffraction grating pattern in its peripheral region is used in addition to an objective lens. The central region of the optical element allows transmission of a laser beam of a first wavelength without any change but increases the diameter of a laser radiation of a second wavelength, and uses a stepped grating profile to achieve this. The peripheral region again allows the transmission of laser radiation of the first wavelength without any change and simultaneously shields radiation of the second wavelength from contributing to the spot formation. In this way the NA for use of radiation of the second wavelength is reduced to the desired value. The central part of the element achieves a diffraction efficiency of at least 90% for the zeroth diffractive order of the first wavelength radiation and an efficiency of at least 70% for the first diffractive order of the second wavelength radiation. In an example shown a four step grating profile is used, with each step height in the grating profile increasing in height by the same value $h_1$.

It is an object of the present invention to provide an improved optical scanning device for scanning different optical record carriers using radiation of a first and second wavelength, respectively.

According to one aspect of the invention, there is provided an optical scanning device for scanning optical record carriers with radiation of a first and a second wavelength, the device having a diffractive part, the diffractive part including a pattern of pattern elements having a stepped profile, wherein the total optical paths pertaining to steps of a pattern element are substantially equal to multiples of said first wavelength, such that radiation of said first wavelength is substantially undiffracted by the said diffractive part and such that said device has a first focusing characteristic for said first wavelength, and wherein the steps are arranged such that radiation of the second wavelength is diffracted by said diffractive part and such that said device has a second focusing characteristic, different to said first focusing characteristic, for a selected diffractive order of the radiation of the second wavelength, characterised in that the relative step heights between adjacent steps of said pattern element include a relative step height having an optical path substantially equal to $a\lambda_1$, wherein a is an integer and a>1 and $\lambda_1$ is said first wavelength, whereby an improved efficiency of transmission for said selected diffractive order of the radiation of the second wavelength is provided.

By selecting appropriate relative step heights having optical paths, one or more of which may be multiples of the first wavelength $a\lambda_1$, radiation of the first wavelength will be substantially undiffracted by the diffractive part, radiation of the second wavelength will simultaneously have a high diffraction efficiency in the selected order, whilst also achieving the desired focusing characteristics. This can be achieved even with a relatively small number of steps in a pattern element, thus improving manufacturing efficiency.

The diffractive part may be operating in reflection or in transmission. When operating in reflection, the diffractive part can be integrated with a mirror used for changing the direction of the optical axis of the radiation in the scanning device. When operating in transmission, the total step heights of steps of a pattern element are preferably substantially equal to multiples of height $h_1$ with $$h_1 = \frac{\lambda_1}{(n - n_0)},$$

where n is the refractive index of the material from which the diffractive part is made, and $n_0$ is the refractive index of the adjacent medium, and the relative step heights between adjacent steps of said pattern element include a relative step height having an optical path substantially equal to $ah_1$.

In accordance with another aspect of the present invention there is provided an optical element for use in an optical scanning device for scanning optical record carriers having a first and second information layer depths with radiation of a first and second wavelength and with a first and second numerical aperture respectively, said optical element including a diffractive part, wherein the diffractive part includes a pattern of pattern elements having a stepped profile, wherein the total optical paths pertaining to steps of a pattern element are substantially equal to multiples of said first wavelength, such that radiation of said first wavelength is substantially undiffracted by the said diffractive part and such that said device has a first focusing characteristic for said first wavelength, and wherein the steps are arranged such that radiation of the second wavelength is diffracted by said diffractive part and such that said device has a second focusing characteristic, different to said first focusing characteristic, for a selected diffractive order of the radiation of the second wavelength, characterised in that the relative step heights between adjacent steps of said pattern element include a relative step height having an optical path substantially equal to $a\lambda_1$, wherein a is an integer and a>1 and $\lambda_1$ is said first wavelength, whereby an improved efficiency of transmission for said selected diffractive order of the radiation of the second wavelength is provided.

In accordance with a further aspect of the invention there is provided a method of designing an optical element for use in an optical scanning device for scanning optical record carriers with radiation of a first and second wavelength, said optical element including a diffractive part, wherein in a first part of said method a diffractive part is designed to approximate a generally sawtooth-like structure with a height $h_2$ on the highest side of each sawtooth-like pattern element generating a phase change substantially equal to $i \cdot 2\pi$, where i is an integer, for radiation of said second wavelength, the sawtooth-like structure being approximated by an initially selected stepped profile representing said sawtooth-like structure, and wherein in a second part of the method the phase profile of the initially selected stepped profile is approximated by a different selected stepped profile with steps of a total step height approximately equal to $h_1'$, with $$h_1' = \frac{\lambda_1}{n-1} k,$$

whereby $\lambda_1$ is said first wavelength, n is the refractive index of the material from which the optical element is made, $n_0$ is the refractive index of the adjacent medium and k is an integer taking a plurality of different values within one pattern element.

Such a two-stage design process is useful for generating a diffractive part which has a substantially maximal transmission efficiency for the zeroth diffractive order radiation of the first wavelength, whilst a relatively high efficiency for the selected higher diffractive order radiation of the second wavelength is also ensured.

In accordance with another aspect of the present invention, there is provided an optical scanning device for scanning optical record carriers with radiation of a first and a second wavelength, the device including a diffractive part, the diffractive part including a pattern of pattern elements having a stepped profile, wherein the step heights are selected: such that radiation of said first wavelength passes said diffractive part in zeroth diffractive order substantially unattenuated and is subsequently focused with a first focusing characteristic; and such that radiation of said second wavelength is diffracted by said diffractive part, resulting in a beam of a selected diffractive order, with a second focusing characteristic different from said first characteristic. The radiation passing the diffractive part may be radiation reflecting on the diffractive part or radiation transmitted through the diffractive part.

In accordance with yet another aspect of the present invention, there is provided an optical element for use in an optical scanning device for scanning optical record carriers with radiation beams of a first and second wavelength and with a first and second numerical aperture respectively, said optical element including a diffractive part, the diffractive part including a pattern of pattern elements having a stepped profile, wherein the step heights are selected: such that radiation of said first wavelength passes said optical element in zeroth diffractive order substantially unattenuated and to provide said device with a first focusing characteristic; and such that radiation of said second wavelength is diffracted by said optical element, resulting in a beam of a selected diffractive order, and to provide said device with a second focusing characteristic different from said first characteristic.

By optimising the properties of the stepped profile for the transmission of the first wavelength radiation, the functioning of a device for scanning high density record carriers, like DVDs, at that wavelength, can be improved.

Embodiments of the invention will now be described, by way of example only, with reference to the accompanying drawings, wherein:

FIG. 1 is a schematic illustration of components common to a device in accordance with the embodiment, to be described below, for scanning an optical record carrier 1. The record carrier 1 is in this embodiment an optical disc as will be described, by way of example, below.

Figure 1:
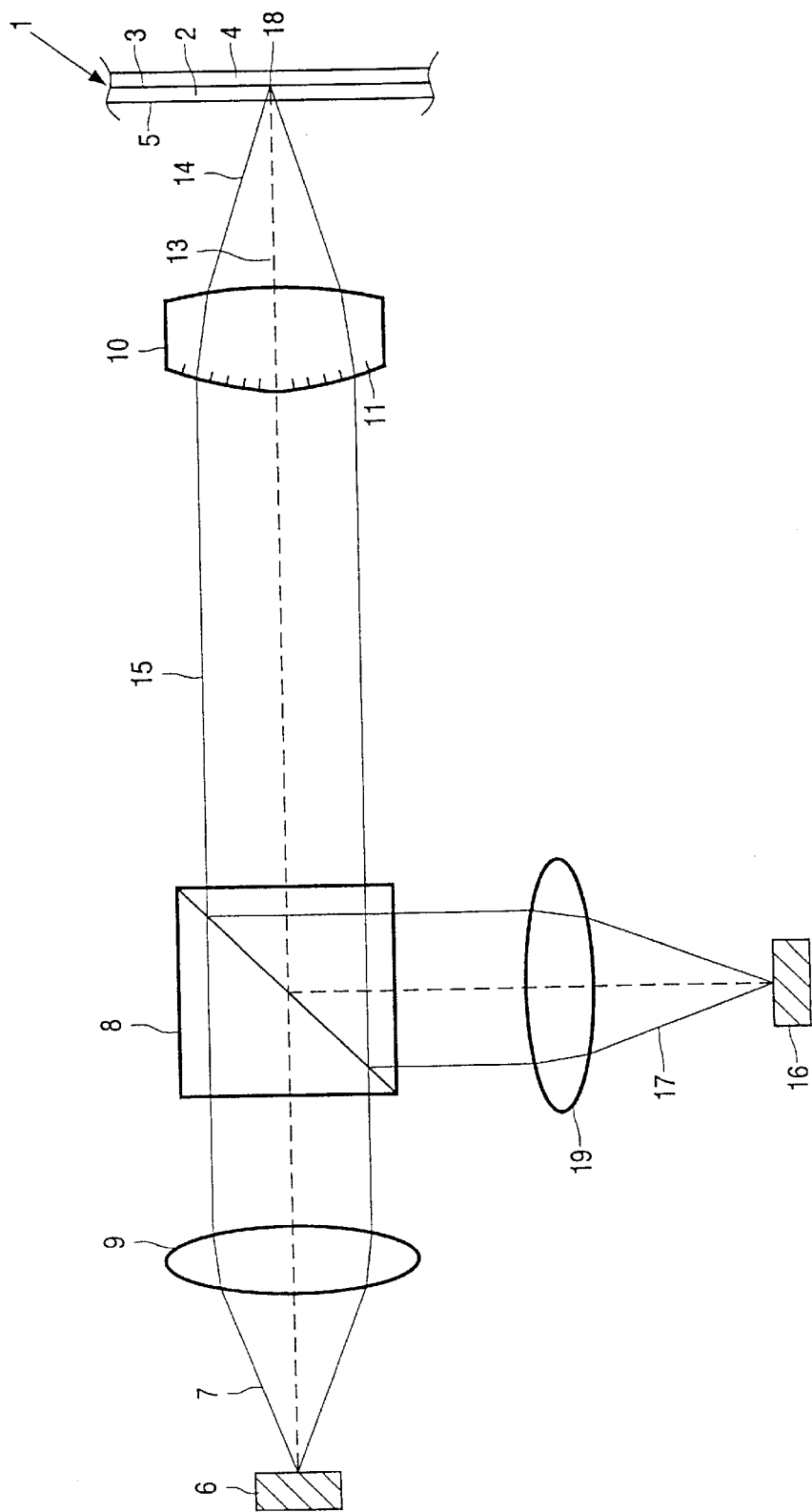
FIG. 1 is a schematic illustration of components of a scanning device for optical record carriers according to one embodiment of the present invention.

The optical disc 1 comprises a transparent layer 2, on one side of which at least one information layer 3 is arranged. The side of the information layer facing away from the transparent layer is protected from environmental influences by a protection layer 4. The side of the transparent layer facing the device is the disc entrance face 5. The transparent layer 2 acts as a substrate for the optical disc by providing mechanical support for the information layer or layers. Alternatively, the transparent layer 2 may have the sole function of protecting the information layer 3, while the mechanical support is provided by a layer on the other side of the information layer, for instance by the protection layer 4 or by a further information layer and transparent layer connected to the uppermost information layer.

Information may be stored in the information layer 3, or information layers, of the optical disc in the form of optically detectable marks arranged in substantially parallel, concentric or spiral tracks, not indicated in FIG. 1. The marks may be in any optically readable form, e.g. in the form of pits, or areas with a reflection coefficient or a direct of magnetisation different from their surroundings, or a combination of these forms.

The scanning device includes a radiation source 6, comprising a tunable semiconductor laser or two separate semiconductor lasers, emitting radiation every first wavelength and of a second wavelength in a diverging radiation beam 7 towards a lens system. The lens system includes a collimator lens 9 and an objective lens 10 arranged long optical axis 13. The collimator lens 3 transforms the diverging beam 7 emitted from the radiation source 6 inches a substantially collimated beam 15. The objective lens 10 comprise a diffractive element, which indicated drawing by the pattern 11 and will be described in more detail below. The objective lens 10 transforms the incident collimated radiation beam 15 into a converging beam 14, having a selected NA, which comes to a spot 18 on the information layer 3. A detection system 16, a second collimator lens 19 and a beam splitter 8 are provided in order to detect data signals, and focus air signals which are used mechanically adjust the axial position of the objective lens 10.

Figure 2A:
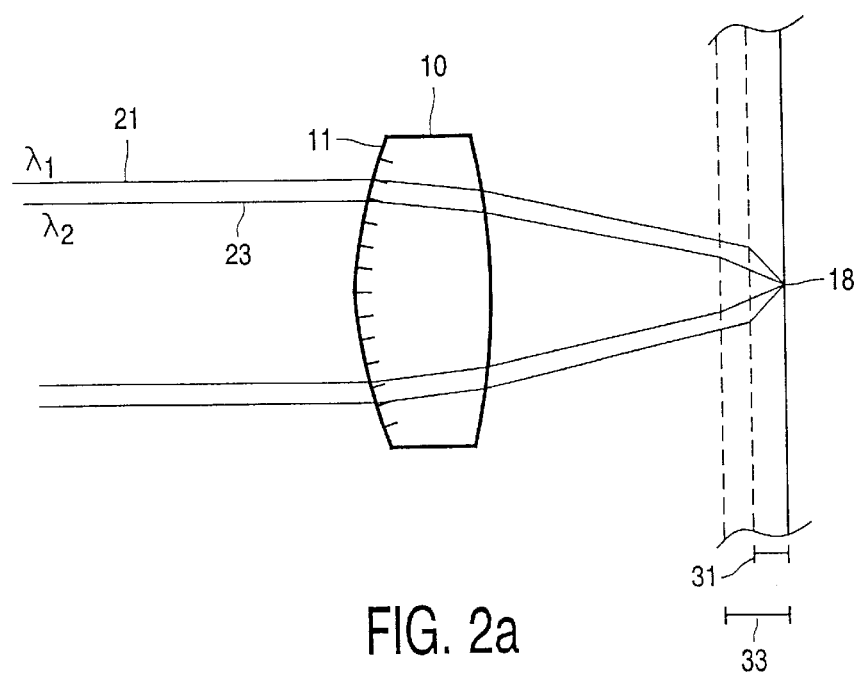
FIG. 2a is a schematic illustration of an objective lens for use in the scanning device of FIG. 1.

FIG. 2a is a schematic illustration of the objective lens 10 for use in the scanning device described above. The scanning device is capable of scanning optical record carriers with a first information layer depth with laser radiation 21 of a first wavelength at a first numerical aperture. The device is further capable of scanning record carriers with a second information layer depth with laser radiation 23 of a second wavelength at a second numerical aperture using the same optical objective lens 10. Discs of DVD format may be scanned with laser radiation of a first wavelength $\lambda_1$ between say 620 and 700 nm, preferably $\lambda_1$=660 nm. A numerical aperture of about 0.6 is used for reading DVD and an NA above 0.6, preferably 0.65, is applied for writing DVD. Record carriers of CD format are scanned with laser radiation of a second wavelength $\lambda_2$ between say 740 and 820 nm, preferably $\lambda_2$=780 nm with a numerical aperture of below 0.5, preferably 0.45. The objective lens 10 corrects for spherical aberration caused by the difference in thickness 31 and 33 of the transparent layers of a DVD and CD carrier, respectively. The lens similarly corrects for spherochromatism and chromatic aberration.

In this embodiment of the invention, reading and writing data on discs of a different format using a single objective element is achieved by using a hybrid lens, i.e. a lens combining diffractive and refractive elements, in an infinite-conjugate mode. Such a hybrid lens can be formed by applying a grating profile on one of the surfaces of a refractive lens, for example by a lithographic process or by diamond turning.

The objective lens 10 is shown as a convex-convex lens; however other lens element types such as plano-convex or convex-concave lenses may also be used. Whilst objective lens 10 is in this embodiment a single lens, it may be a compound lens containing two or more lens elements. Objective lens 10 may for example a comprise refractive objective lens element and a planar lens diffractive element. The diffractive element may also be provided on an optical element separate from the objective lens, for example on a quarter wavelength plate or a beam splitter.

Figure 2B:
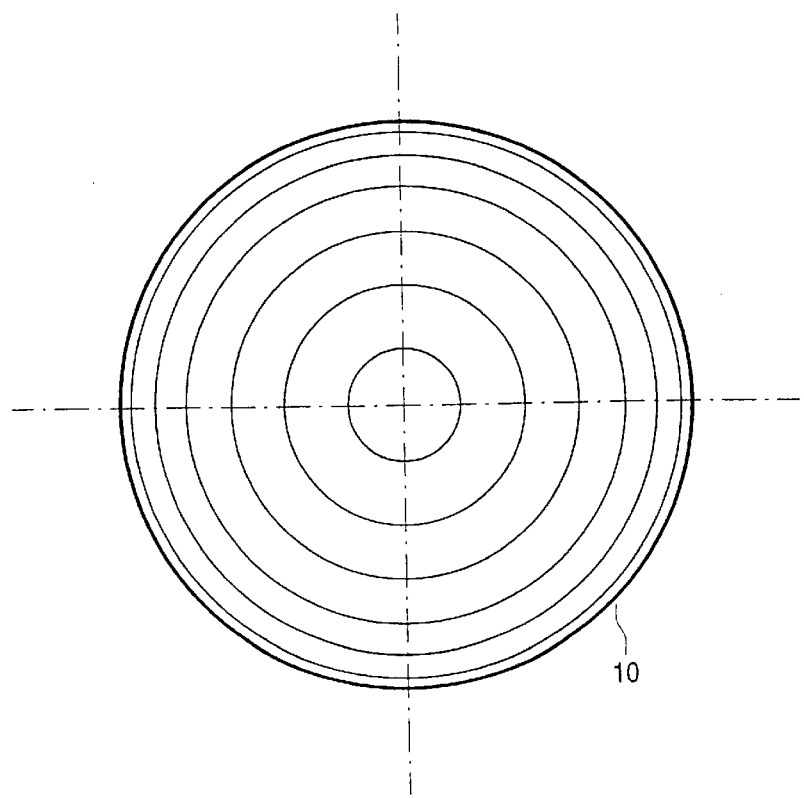
FIG. 2b is a schematic front view of the objective lens of FIG. 2a, showing an annular diffractive structure.

FIG. 2b is a schematic front view of the objective lens 10 illustrating the diffractive structure. It can be seen that a circular grating structure has been applied with a pattern of coaxially ring-shaped pattern elements with gradually increasing width towards the centre of the lens. Each pattern element defines a so-called zone of the diffractive element. In order to enable operation of the lens for both wavelengths in an infinite-conjugate manner, the lens generates a different amount of spherical aberration for the DVD and CD-wavelength, to correct for the disc thickness difference. The spherical aberration difference caused by the objective lens due to the diffractive element is proportional to $m_1\lambda_1-m_2\lambda_2$, whereby $m_1$ and $m_2$ are the diffraction orders of the $\lambda_1$ and $\lambda_2$ laser radiation, respectively. In order to be able to correct for the effects of the disc thickness difference, the term $m_1\lambda_1-m_2\lambda_2$ has to be different from zero and thus at least for radiation of one wavelength a non-zero diffractive order is chosen.

In this embodiment, we select the zeroth order for scanning data on DVD using $\lambda_1$ and the first order for scanning data on CD using $\lambda_2$. In order to maximise the efficiency for transmission of the $\lambda_1$ radiation in zeroth order, since transmission efficiency for DVD is more important than for CD, the diffractive element has a stepped grating profile, whereby the step heights are chosen in a way that the steps introduce a phase change substantially equal to a multiple of $2\pi$. Simultaneously, the efficiency for transmission of the $\lambda_2$ radiation in a selected diffractive order, for example first order, is to be sufficient for reliable read-out of data from CD.

Figure 3A:
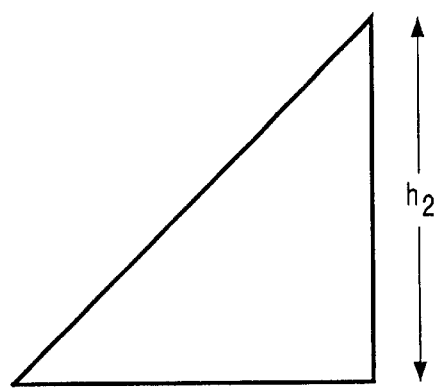
FIG. 3a shows an ideal sawtooth-like grating structure.

A high efficiency for the $\lambda_2$ radiation could ideally be achieved with a sawtooth-like blazed grating structure. The profile of a pattern element in one zone of such an ideal grating is shown in FIG. 3a. By the use of such a blazed grating, and appropriately selecting the total height of each pattern element, the transmission efficiency of radiation of a certain diffractive order can be maximised, whereas the transmission efficiency for the other diffraction orders is reduced. For example, in case the sawtooth-like grating is optimised for an efficient transmission of the first diffractive order, an optimised grating profile has a height $h_2$ on the highest side of each zone such that it generates a phase change of $2\pi$ for the chosen wavelength of $\lambda_2$.

A sawtooth structure optimised for the first diffraction order can be approximated by a stepped profile, whereby the phase profile is then given by (c.f. Dammann, Optik 31 (1972), p.95):

$$\phi(x) = 2\pi \frac{2j-1}{2P} \quad (1)$$

for j−1≤xP≤j where j=1,2, . . . P and P is the number of steps used to approximate one zone of the sawtooth-like structure. The resulting structure, illustrated in FIG. 3b for a four step approximation, is one in which all relative step heights are equal. The diffraction efficiency eff which can be achieved by this approximation is given by $$\mathit{eff} = \left(\frac{P\sin(\pi/P)}{\pi}\right)^2 \quad (2)$$

The efficiency eff is defined as the transmission efficiency of the intensity of the radiation due to the diffractive process.

Thus, the more steps are chosen to approximate the blazed grating, the higher the efficiency that can be achieved for diffraction of the second wavelength $\lambda_2$.

However it is desirable to use the lowest possible number of steps in each pattern element of the diffractive element in order to achieve greater manufacturing efficiency for the objective lens 10. If for example a certain minimal transmission efficiency for a selected diffractive order of the $\lambda_2$ radiation is to be achieved, the number of steps per zone needed can be derived as will be described below. Alternatively, if the maximal number of steps per zone is given, which may be limited by the manufacturing process of the optical element, the transmission efficiency for a selected diffractive order of the $\lambda_2$ radiation may be derived.

Furthermore, in order to maximise the transmission efficiency for $\lambda_1$ radiation, the grating structure is stepped with each total step height $h_1'$ chosen to introduce a phase change substantially equal to a multiple of $2\pi$. Thus, total step height $h_1'$ is determined to be a multiple of height $h_1$, with $$h_1 = \frac{\lambda_1}{n - n_0}, \qquad (3)$$

wherein n is the refractive index of the lens material and $n_0$ is the refractive index of the adjacent medium (if air, $n_0=1$).

However, a step with total step height $h_1'$ does not introduce a phase change of a multiple of $2\pi$ for $\lambda_2$ radiation (unless $\lambda_1$ is a multiple of $\lambda_2$). Rather, the phase difference generated by each step satisfies $\phi_2=2\pi(b+c)$, where b is an integer which may vary across steps of said profile, and wherein c is a non-integer less than 1 and greater than 0 which does vary across steps of said profile.

Table 1 shows the phase changes introduced by steps of total step height $h_1'$ being a multiple of height $h_1$ for the $\lambda_2$ radiation. Here for exemplary purposes the refractive index n of the objective lens is assumed to be n=1.65 for both the $\lambda_1$ and $\lambda_2$ radiation. $\lambda_1$ and $\lambda_2$ in this example are 660 nm and 780 nm respectively.

TABLE 1

Phase change introduced by a step of height $h_1'$ being a multiple of $h_1$ when laser radiation of 780 nm is used.

| m = $h_1'/h_1$ | $h_1$ [μm] | b | c = (Phase change modulo $2\pi$)/$2\pi$ |
|---|---|---|---|
| 0 | 0.0 | 0 | 0.0 |
| 1 | 1.015 | 0 | 0.846 |
| 2 | 2.031 | 1 | 0.692 |
| 3 | 3.046 | 2 | 0.538 |
| 4 | 4.062 | 3 | 0.385 |
| 5 | 5.077 | 4 | 0.231 |
| 6 | 6.092 | 5 | 0.077 |
| 7 | 7.108 | 5 | 0.923 |
| 8 | 8.123 | 6 | 0.769 |

Where $\lambda_1$ and $\lambda_2$ are relatively close together (i.e. ½<$\lambda_1$/$\lambda_2$<1)the value of c for the step value m equal to 1 will be close to 1, as m increases, c will decrease to a value close to before returning to a value close to 1. Thus a first series of step values m=1,2, . . . etc. will exist before c decreases to the value close to zero. In the example shown in Table 1, this first series consists of m=1, 2, 3, 4, 5, 6. Generally, the first series consists of m=1 . . . M, where m is all values satisfying:

$$m\lambda_1 > (m-1)\lambda_2 \qquad (4)$$

Figure 3B:
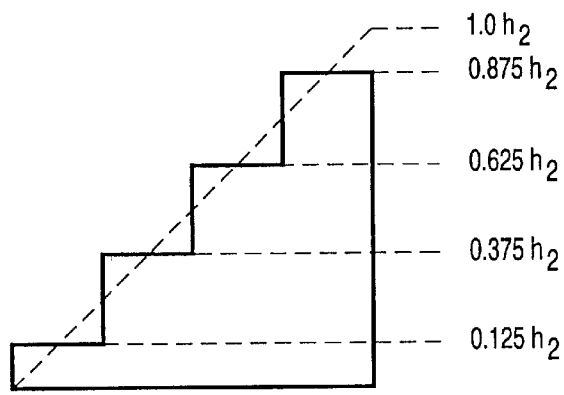
FIG. 3b shows a stepped grating structure of four steps approximating the sawtooth-like grating structure.

In a further stage of the design process the stepped grating profile shown in FIG. 3b is approximated further, such that only step heights $h_1'$ being substantially equal to a multiple of $h_1$ are used. Although this slightly reduces the efficiency for the transmission of the first diffractive order of $\lambda_2$ radiation, it is ensured that the zeroth diffractive order of the $\lambda_1$ radiation is transmitted with substantially 100% efficiency. In order to achieve a good approximation we first calculate the phase profile which results from approximating the sawtooth-like grating structure by the stepped function for a particular number of steps with help of equation (1).

In order to find a good approximation in steps heights $h_1'$ being a multiple of height $h_1$, we look at phase changes introduced by such steps for the transmission of $\lambda_2$ radiation as listed in Table 1. In order to ensure that the total step heights are relatively small, and that relative step heights do not suddenly jump within a pattern element, the possible selection of the steps is preferably limited to those of the first series defined by equation (4).

This is now explained in more detail for the two-step approximation for first order diffraction as an example, for which a solution in accordance with the present invention is set out in Table 2.

TABLE 2

Step profile for a two step approximation.

| subzone | $\phi/2\pi$ ideal | $h_1'/h_1$ |
|---|---|---|
| 0.0–0.5 | 0.25 | 5 |
| 0.5–1.0 | 0.75 | 2 |
| efficiency | 40.5% | 39.9% |

The resulting phase change (in units of $2\pi$) of the first step of the ideal profile is 0.25. A total step height $h_1'$ in units of $h_1$ which introduces a phase change close to 0.25 is thus required. From Table 1, a step of a height $h_1'=5\, h_1$, resulting in a phase change of 0.231, gives the best match. For a total step height introducing a phase change of 0.75 a step height $h_1'=2h_1$, resulting in a phase change of 0.692, gives the best match. In this two-step approximation example, the efficiency achieved for the second wavelength by the first approximation is 40.5% which decreases to only 39.9% by further approximating the stepped profile with steps of height $h_1'$ being a multiple of height $h_1$. If, on the other hand, a step height of $0h_1$ followed by 1 $h_1$ is used, the resulting efficiency would only be 8.8% for the first diffractive order for the 780 nm radiation.

In contrast to the first approximation, in accordance with the present invention the resulting step profile no longer has constantly increasing step heights, or if we define the height of a step in relation to an adjacent step, the resulting step heights within one zone comprise a plurality of different values.

By providing a pattern element design in which the relative step heights between adjacent steps include a relative height which is substantially equal to $ah_1$, wherein a is an integer and a>1, the efficiency of the grating in relation to its performance for $\lambda_2$ can be significantly improved in comparison with a solution in which all relative step heights are equal to $h_1$.

Tables 3 and 4 show solutions in accordance with the present invention in the case of three and four step patterns, respectively.

TABLE 3

Step profile for a three step approximation.

| subzone | $\phi/2\pi$ ideal | $h_1'/h_1$ |
|---|---|---|
| 0.0–0.333 | 0.166 | 5 |
| 0.333–0.666 | 0.5 | 3 |
| 0.666–1.0 | 0.833 | 1 |
| efficiency | 68.4% | 67.2% |

TABLE 4

Step profile for a four step approximation.

| subzone | $\phi/2\pi$ ideal | $h_1'/h_1$ |
|---|---|---|
| 0.0–0.25 | 0.125 | 6 |
| 0.25–0.5 | 0.375 | 4 |
| 0.5–0.75 | 0.625 | 2 |

TABLE 4-continued

Step profile for a four step approximation.

| subzone | φ/2π ideal | h$_1$'/h$_1$ |
|---|---|---|
| 0.75–1.0 | 0.875 | 1 |
| efficiency | 81.1% | 75.1% |

Figure 3C:
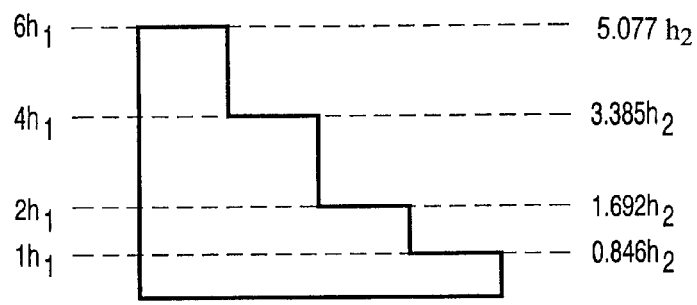
FIG. 3c shows a stepped grating structure further approximating the structure of FIG. 3b, in accordance with an embodiment of the invention.

FIG. 3C. illustrates the resulting step profile for the four step example. On the right hand side the height h$_1$' is given in units of height h$_2$'. The resulting phase changes c for the 780 nm radiation are 0.077, 0.385, 0.692 and 0.846 for the first to forth step, respectively. The first step at the left-hand side of FIG. 3C has the largest total step height and simultaneously generates the smallest value c within the pattern element. It can be seen in that the monotonically ascending structure, varying with the constant relative step heights, of the first approximation shown in FIG. 3b is converted into a monotonically ascending structure, varying with different relative step heights, in the resulting profile of the second approximation shown in FIG. 3c.

It is also possible to provide a step profile which is no longer in monotonically ascending or descending order. For example the fourth step in four step example could be approximated by a step height h$_1$'=8h$_1$ instead of h'$_1$=1 h$_1$. But the resulting approximation has a lower efficiency and such a shape is in any case more difficult to manufacture. However, if the method is applied in a case with different parameters, a profile with non-monotonically descending shape may give a better approximation.

Whilst in the above described embodiment a scanning device for scanning carriers of DVD and CD format is described, it is to be appreciated that the scanning device can be alternatively used for any other types of optical record carriers to be scanned. Whilst in the above described embodiment 660 nm and 780 nm laser radiation is used, it is to be appreciated that radiation of any other combinations of wavelengths suitable for scanning optical record carriers may be used.

Where, as the above the above-described embodiment, the grating structure is provided directly on the curved surface of a lens the radiation does not enter the structure perpendicular everywhere, and the step heights are preferably corrected to compensate for the curvature of the surface. This height correction can be typically be of the order of 10% at the edge where the curvature is largest. A similar correction is described in M. A. Golub, "Generalized conversion from the phase function to the blazed surface-relief profile of diffractive optical elements", in J. Opt. Soc. Am. A 16 (1999) p1194–1201.

It is to be understood that, where the term "approximate" or "approximation" is used herein, that it is intended to cover a range of possibilities approximations, the definition including approximations which are in any case sufficient to provide a working embodiment of an optical scanning device serving the purpose of scanning different types of optical record carriers.

What is claimed is:

1. An optical scanning device for scanning optical record carriers with radiation of a first and a second wavelength, the device having a focusing element with a diffractive part, the diffractive part including a pattern of pattern elements having a stepped profile, wherein the total optical paths pertaining to steps of a pattern element are substantially equal to multiples of said first wavelength, such that radiation of said first wavelength is substantially undiffracted by the said diffractive part and such that said device has a first focusing characteristic for said first wavelength, and wherein the steps are arranged such that radiation of the second wavelength is diffracted by said diffractive part and such that said device has a second focusing characteristic, different to said first focusing characteristic, for a selected diffractive order of the radiation of the second wavelength, and the relative step heights between adjacent steps of said pattern element include a relative step height having an optical path substantially equal to aλ$_1$, wherein a is an integer and a>1 and λ$_1$ is said first wavelength, whereby an improved efficiency of transmission for said selected diffractive order of the radiation of the second wavelength is provided.

2. An optical scanning device according to claim 1, wherein the pattern elements are adapted to operating in transmission, and the total step heights of steps of a pattern element are substantially equal to multiples of height h$_1$ with $$h_1 = \frac{\lambda_1}{(n - n_0)}$$

where n is the refractive index of the material from which the diffractive part is made, and n$_0$ is the refractive index of the adjacent medium, and the relative step heights between adjacent steps of said pattern element include a relative step height having an optical path substantially equal to ah$_1$.

3. An optical scanning device according to claim 1, wherein the relative step heights within said pattern element include a plurality of different values.

4. An optical scanning device according to claim 1, wherein said total step heights are selected such that said steps each generate a phase difference for radiation of said second wavelength which satisfies φ$_2$=2π (b+c), where b is an integer which may vary across steps of said pattern element, and wherein c is a non-integer less than 1 which does vary across steps of said pattern element.

5. An optical scanning device according to claim 4, wherein c is either monotonically increasing or monotonically decreasing across said pattern element.

6. An optical scanning device according to claim 4, wherein (b+c) is either monotonically increasing or monotonically decreasing across said pattern element.

7. An optical scanning device according to claim 4, wherein a step at one end of said pattern element has the largest total step height in said pattern element and said step generates a phase difference with the smallest value for c in said pattern element.

8. An optical scanning device according to claim 1, wherein a step at one end of said pattern element generates a phase difference of approximately a multiple of 2π for radiation of said second wavelength.

9. An optical scanning device according to claim 1, wherein a difference in spherical aberration generated for radiation of said first and second wavelength caused by said diffractive part substantially compensates for a difference in spherical aberration generated in first and second optical record carriers to be scanned by said device.

10. An optical element for use in an optical scanning device for scanning optical record carriers having a first and second information layer depths with radiation of a first and second wavelength and with a first and second numerical aperture respectively, said optical element including a focusing element with a diffractive part, wherein the diffractive part includes a pattern of pattern elements having a stepped profile, wherein the total optical paths pertaining to steps of a pattern element are substantially equal to multiples of said first wavelength, such that radiation of said first wavelength is substantially undiffracted by the said diffractive part and such that said device has a first focusing characteristic for said first wavelength, and wherein the steps are arranged such that radiation of the second wavelength is diffracted by said diffractive part and such that said device has a second focusing characteristic, different to said first focusing characteristic, for a selected diffractive order of the radiation of the second wavelength, wherein the relative step heights between adjacent steps of said pattern element include a relative step height having an optical path substantially equal to $a\lambda_1$ wherein a is an integer and a>1 is said first wavelength, whereby an improved efficiency of transmission for said selected diffractive order of the radiation of the second wavelength is provided.

11. An optical scanning device according to claim 10, wherein the pattern elements are adapted to operation in transmission, and the total step heights of steps of a pattern element are substantially equal to multiples of height $h_1$ with $$h_1 = \frac{\lambda_1}{(n-n_0)},$$

where n is the refractive index of the material from which the diffractive part is made, and $n_0$ is the refractive index of the adjacent medium, in that the relative step heights between adjacent steps of said pattern element include a relative step height having an optical path substantially equal to $ah_1$.

12. A method of designing an optical element for use in an optical scanning device for scanning optical record carriers with radiation of a first and second wavelength, said optical element including a diffractive part, designing a first part of said diffractive part to approximate a generally sawtooth-like structure with a height $h_2$ on the highest side of each sawtooth-like pattern element generating a phase change substantially equal to $i \cdot 2\pi$, where i is an integer, for radiation of said second wavelength, the sawtooth-like structure being approximated by an initially selected stepped profile representing said sawtooth-like structure, and approximating the different selected stepped profile for a second part of the diffractive part of the initially selected stepped profile by approximating said different selected stepped profile with steps of a total step height approximately equal to $h_1'$, with $$h_1' = \frac{\lambda_1}{n-1}k$$

whereby $\lambda_1$ is said first wavelength, n is the refractive index of the material from which the optical element is made, $n_0$ is the refractive index of the adjacent medium and k is an integer taking a plurality of different values within one pattern element.

13. A method according to claim 12, wherein the initially selected stepped profile has a phase profile substantially equal to one defined by:

$$\phi(x) = 2\pi i \frac{(2j-1)}{2P}$$

for $j-1 \leq xP \leq j$, j=1, 2, ... P,
where P is the number of steps in each of the pattern elements and i is an integer.

14. A method according to claim 12, further comprising the step of manufacturing said objective lens.

15. An optical scanning device for scanning optical record carriers with radiation of a first and second wavelength, the device including a focusing element with a diffractive part, the diffractive part including a pattern of pattern elements having a stepped profile, wherein the step heights are selected:

such that radiation of said first wavelength passes said diffractive part in zeroth diffractive order substantially unattenuated and is subsequently focused with a first focusing characteristic; and such that radiation of said second wavelength is diffracted by said diffractive part, resulting in a beam of a selected diffractive order, with a second focusing characteristic different from said first characteristic.

16. An optical element for use in an optical scanning device for scanning optical record carriers with radiation beams of a first and second wavelength and with a first and second numerical aperture respectively, said optical element including a focusing element with a diffractive part, the diffractive part including a pattern of pattern elements having a stepped profile, wherein the step heights are selected:

such that radiation of said first wavelength passes said optical element in zeroth diffractive order substantially unattenuated and to provide said device with a first focusing characteristic; and such that radiation of said second wavelength is diffracted by said optical element, resulting in a beam of a selected diffractive order, and to provide said device with a second focusing characteristic different from said first characteristic.

* * * * *